(12) United States Patent
Barragan

(10) Patent No.: US 9,096,392 B1
(45) Date of Patent: Aug. 4, 2015

(54) CONVEYOR BELT STEAM CLEANING DEVICE

(71) Applicant: Sergio S. Barragan, Elburn, IL (US)

(72) Inventor: Sergio S. Barragan, Elburn, IL (US)

( * ) Notice: Subject to any disclaimer, the term of this patent is extended or adjusted under 35 U.S.C. 154(b) by 0 days.

(21) Appl. No.: 14/473,479

(22) Filed: Aug. 29, 2014

(51) Int. Cl.
*B65G 45/22* (2006.01)
*B65G 45/24* (2006.01)
*B65G 45/10* (2006.01)

(52) U.S. Cl.
CPC ...................................... *B65G 45/22* (2013.01)

(58) Field of Classification Search
None
See application file for complete search history.

(56) References Cited

U.S. PATENT DOCUMENTS

| | | | |
|---|---|---|---|
| 3,815,728 A | 6/1974 | Vaughan | |
| 4,155,293 A * | 5/1979 | Spiel et al. | 99/352 |
| 4,918,778 A | 4/1990 | Chupin et al. | |
| 7,204,365 B2 * | 4/2007 | Behymer et al. | 198/497 |
| 7,225,915 B2 | 6/2007 | Kelly et al. | |
| 8,141,695 B2 * | 3/2012 | Kraus et al. | 198/502.1 |

* cited by examiner

*Primary Examiner* — Kavel Singh
(74) *Attorney, Agent, or Firm* — Crossley Patent Law

(57) ABSTRACT

A conveyor belt steam cleaning device to clean a continuous loop conveyor belt of a conveyor stand including a housing attached to a conveyor belt stand, a steam spraying unit and a wiping unit disposed below the housing, and a steamer unit disposed below the conveyor stand. The steamer unit includes a boiler, a water collection tray, a pump, a filter and an actuator. The actuator is in operational communication with a power source, the boiler and the pump. The boiler contains and heats water to the temperature required create steam. The steam is transferred to the steam spraying unit which dispenses steam to clean and the wiping unit dries the belt as it moves under the housing. Condensate from the steam is collected in the water collection tray. The pump drains the water collection tray and pumps the condensate through the filter and recycles it back to the boiler.

4 Claims, 6 Drawing Sheets

CONVEYOR BELT STEAM CLEANING DEVICE

BACKGROUND OF THE INVENTION

Various types of conveyor belt cleaning devices are known in the prior art. However, what is needed is a conveyor belt steam cleaning device including a housing which is removably attachable to the top of the conveyor belt stand at a retail checkout area. A steam spraying unit and a wiping unit are disposed below the housing. A steamer unit is disposed below the conveyor stand. The steamer unit includes a boiler, a water collection tray, a pump, a filter and an actuator. The actuator is in operational communication with a power source, the boiler and the pump. The boiler contains and heats water to the temperature required create steam. The steam is transferred to the steam spraying unit which dispenses steam to clean and the wiping unit dries the belt as it moves under the housing. Condensate from the steam is collected in the water collection tray. The pump drains the water collection tray and pumps the condensate through the filter and recycles it back to the boiler.

FIELD OF THE INVENTION

The present invention relates to conveyor belt cleaning devices, and more particularly, to a conveyor belt steam cleaning device which cleans and sanitizes an existing continuous loop conveyor belt contained within a conveyor stand at a retail checkout area.

SUMMARY OF THE INVENTION

The general purpose of the present conveyor belt steam cleaning device, described subsequently in greater detail, is to provide a conveyor belt steam cleaning device which has many novel features that result in a conveyor belt steam cleaning device which is not anticipated, rendered obvious, suggested, or even implied by prior art, either alone or in combination thereof.

To accomplish this, the present conveyor belt steam cleaning device includes a housing removably attachable to the top of a conveyor belt stand. A steam spraying unit and a wiping unit are disposed below the housing in a position above and horizontal to the conveyor belt surface. The wiping unit includes at least one disposable, absorbable microfiber roller which is disposed across and in contact with the conveyor belt surface. A steamer unit is disposed below the conveyor stand directly below the housing. The steamer unit includes a boiler, a water collection tray, a pump, a filter and an actuator. The actuator is in operational communication with a power source, the boiler and the pump. The boiler contains and heats water to the temperature required create steam. When the water vaporizes to become steam in the boiler, the expansion pressurizes and the steam is forced out of the boiler by its own pressure and is transferred to the steam spraying unit which dispenses the steam to clean and sanitize the belt. Then the wiping unit wipes and dries the belt as it moves under the housing. Condensate from the steam is collected in the water collection tray. The pump drains the water collection tray and pumps the condensate through the filter and recycles it back to the boiler for reuse. The boiler is configured with a port and a port plug which allows for introduction of water into the boiler.

Thus has been broadly outlined the more important features of the present conveyor belt steam cleaning device so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
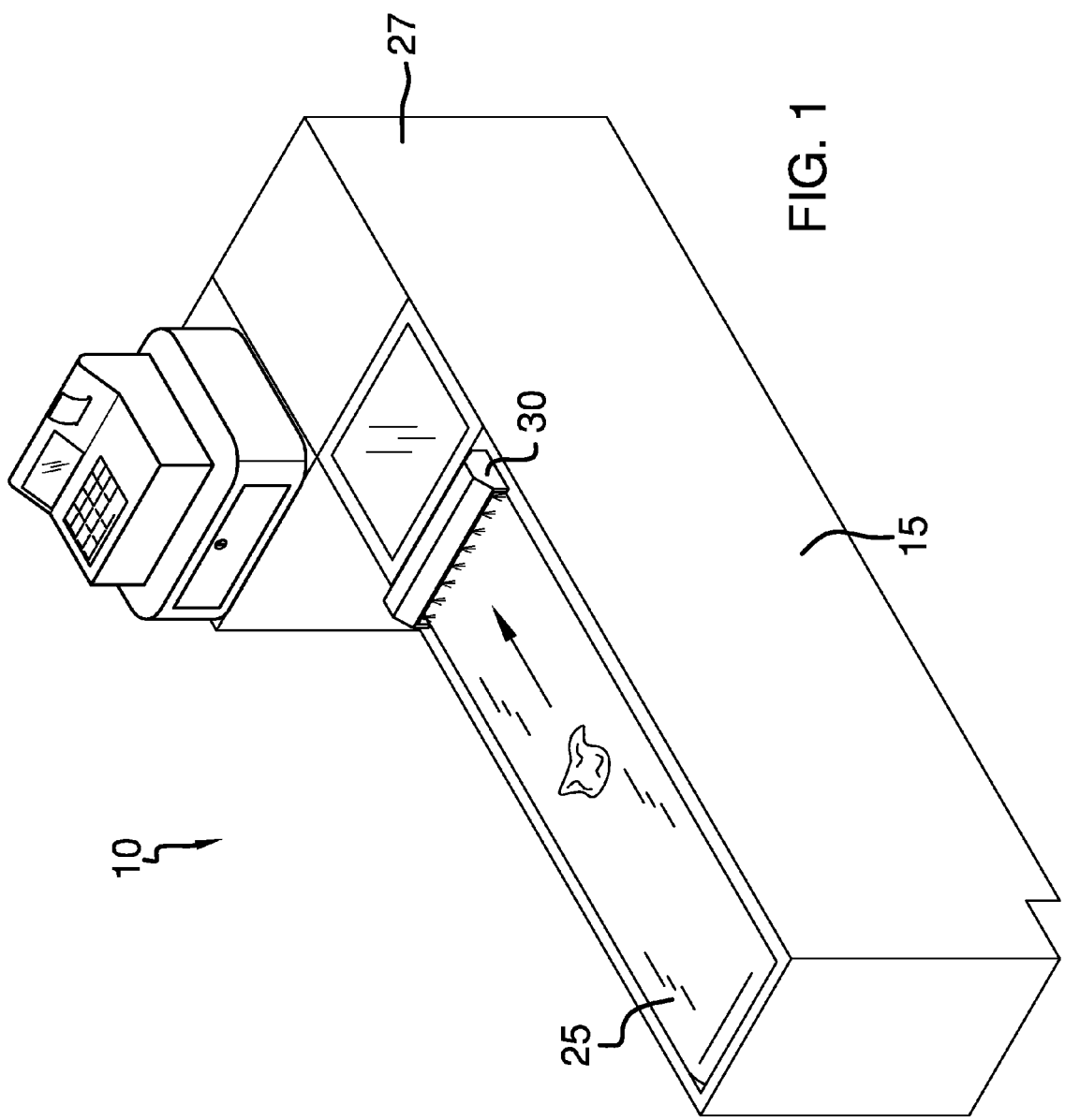
FIG. 1 is an in use view.
Figure 2:
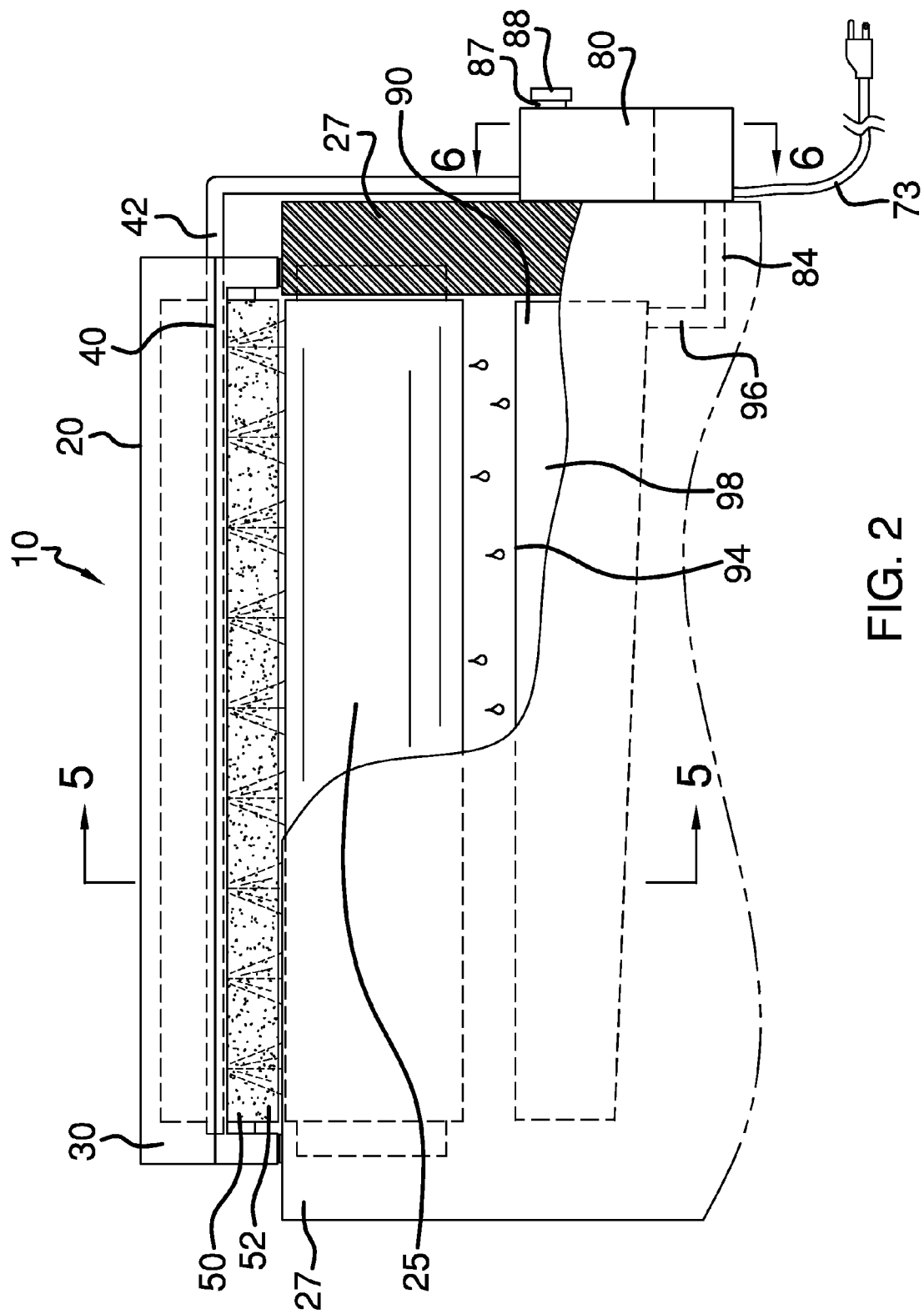
FIG. 2 is a front elevation view.
Figure 3:
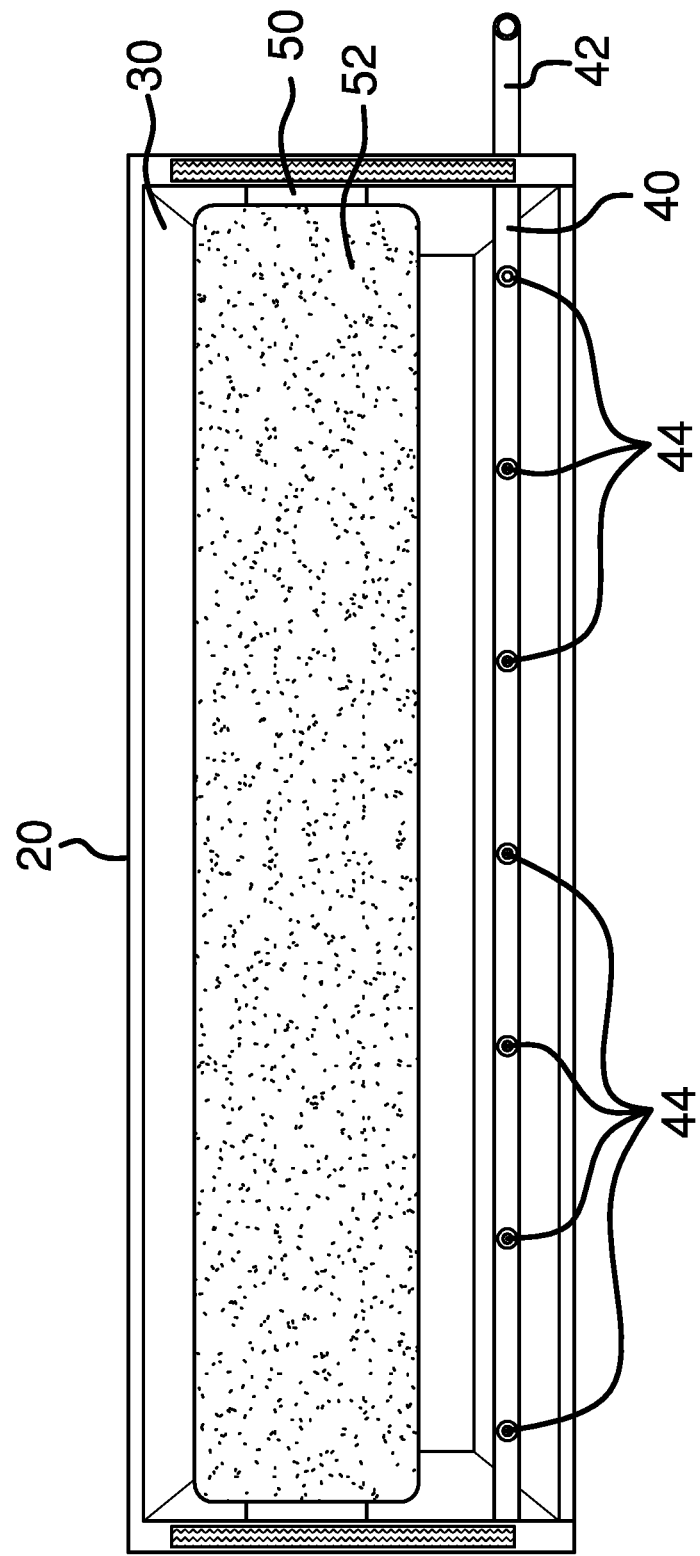
FIG. 3 is a bottom view.
Figure 4:
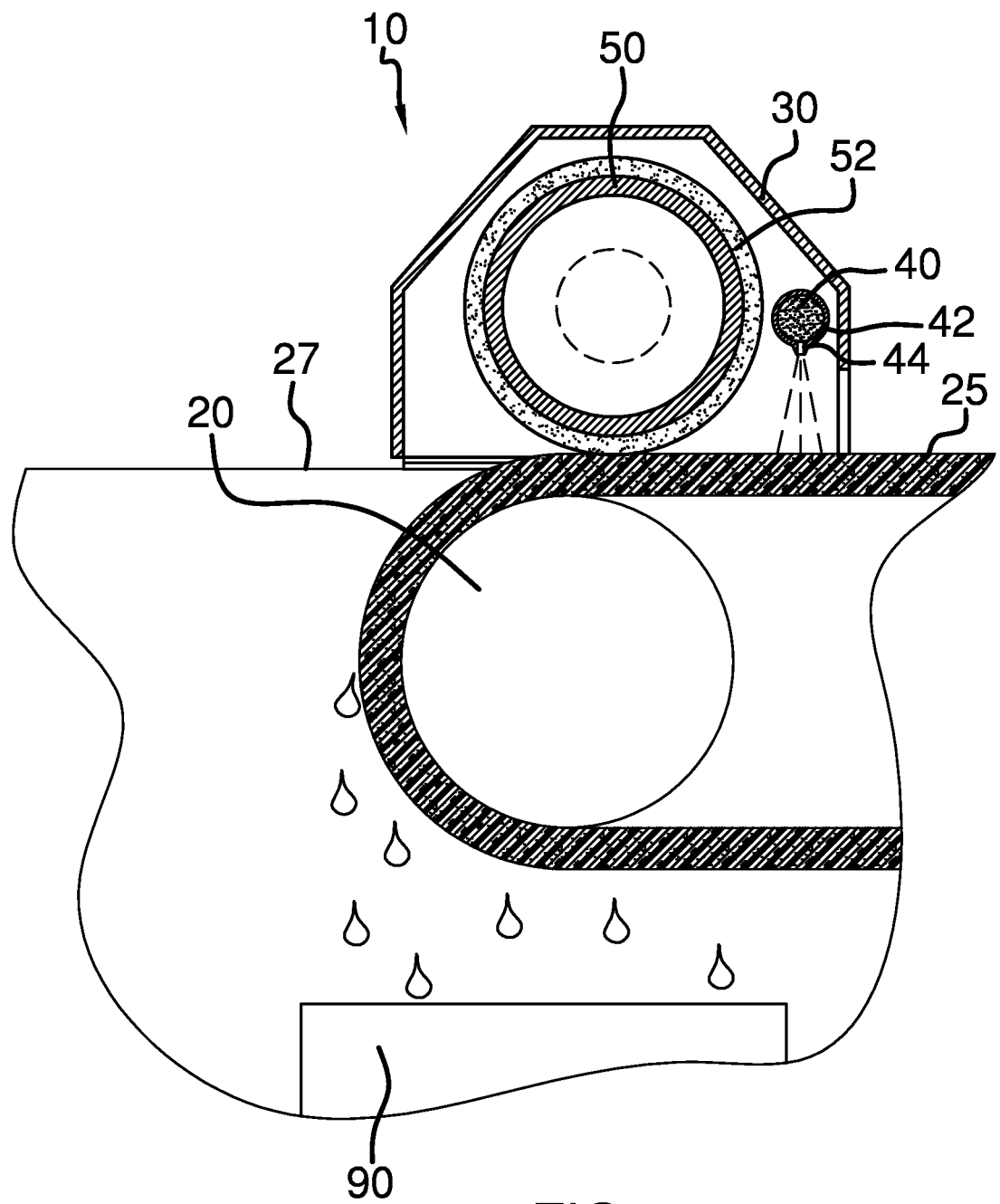
FIG. 4 is a cross-sectional view.
Figure 5:
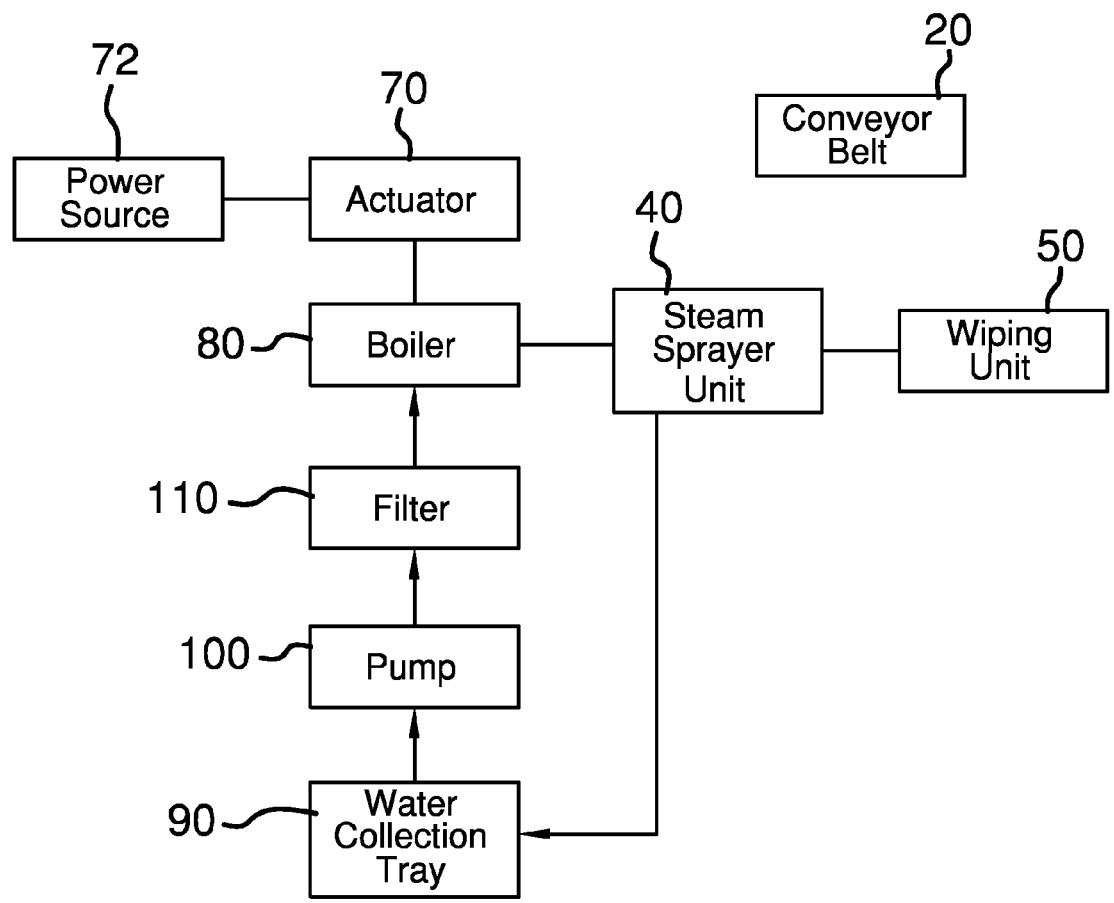
FIG. 5 is a block diagram.
Figure 6:
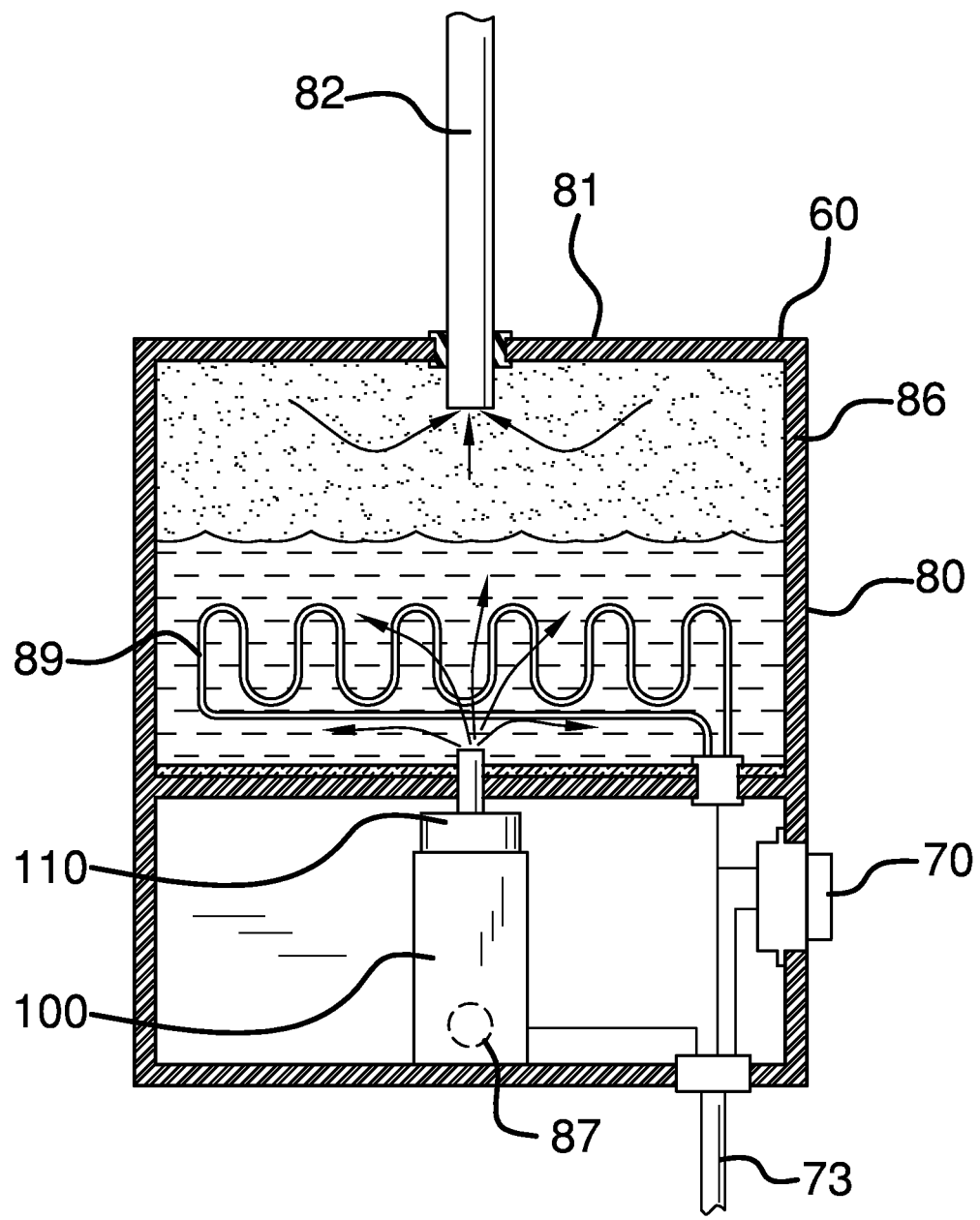
FIG. 6 is cross-sectional view taken along line 6-6 of FIG. 2.

With reference now to the drawings, and in particular FIGS. 1 through 6 thereof, an example of the instant conveyor belt steam cleaning device employing the principles and concepts of the present conveyor belt steam cleaning device and generally designated by the reference number 10 will be described.

Referring to FIGS. 1 through 6 the present conveyor belt steam cleaning device 10 is illustrated. The conveyor belt steam cleaning device 10 is installed on an existing continuous loop conveyor belt 20 having a surface 25 within a conveyor stand 27. The conveyor belt steam cleaning device 10 provides continuous cleaning, and alternately on-demand cleaning, of the conveyor belt surface 25 in order to remove any solids or fluids from the surface 25 thereby providing a sanitized and clean conveyor belt surface 25.

The device 10 includes a housing 30, a steam spraying unit 40, a wiping unit 50, and a steamer unit 60.

The housing 30 is removably attachable to the top of the conveyor stand 27 and is disposed in a horizontal position with respect to the conveyor belt surface 25 allowing for movement of the conveyor belt 20. The steam spraying unit 40 is contained below the housing 30. The steam spraying unit 40 includes a tube 42 and a plurality of nozzles 44 configured to dispense steam on the conveyor belt surface 25 as the conveyor belt 20 moves under the steam spraying unit 40.

The wiping unit 50 is also contained below the housing 30. The wiping unit 50 includes at least one disposable, absorbable, microfiber roller 52 which is disposed across and in contact with the conveyor belt surface 25. The wiping unit 50 wipes and dries the steamed conveyor belt surface 25 as the conveyor belt 20 moves under the wiping unit 50.

The housing 30 is configured to deflect heat and moisture from steam towards the conveyor belt surface 25.

The steamer unit 60 is disposed in a position directly beneath a conveyor stand 27. The steamer unit comprises an actuator 70, a boiler 80, a water collection tray 90, a pump 100, and a filter 110.

The actuator 70, which is in operational communication with an AC power source 72 by way of a power cord 73. The actuator 72 activates and alternately deactivates the steamer unit 60.

The boiler 80, which is in operational communication with the actuator 70, has a top end 81 configured with a first pipe 82, a bottom end 83 configured with a second pipe 84, and a continuous outer wall 86 configured with a port 87 and a port plug 88. The first pipe 82 is configured to couple to the tube 42 of the steam spraying unit 40. The boiler 80 includes a heating element 89 disposed within the outer wall 86 proximal to the bottom end 83. The boiler 80 is configured to contain and heat water to the temperature required convert water to steam. When the water vaporizes to become steam in the boiler, the expansion pressurizes and the steam is forced out of the boiler by its own pressure and is transferred through the first pipe 82 to the steam spraying unit 40. The steam spraying unit 40 dispenses the steam through the plurality nozzles 44 to sanitize the conveyor belt surface 25. Then the wiping unit 50 wipes and dries the conveyor belt surface. The port 87 allows for the addition of water to the boiler 80 and the port plug 88 seals the boiler 80 for steam pressurization when closed.

The water collection tray 90 is disposed within the conveyor stand 27 directly below the conveyor belt 20 and the housing 30. The water collection tray 90 is a rectangular prism shaped cavity 92 with an open top side 94, a closed bottom side 95 configured with a third pipe 96, and four sides 98. The water collection tray 70 collects condensate from the steam spraying unit as the conveyor belt 20 around the conveyor 15.

A pump 100, in operational communication with the actuator 70, is disposed between the water collection tray 90 and a filter unit 100. The pump 100 couples with the third pipe 96 of the water collection tray 90 to drain and pump the condensate to the filter unit 100. The filter unit 110 removes impurities and solids from the condensate and couples to the second pipe 84 of the boiler 80. The pump 100 recycles the filtered condensate from the water collection tray 90 back to the boiler 80 for reuse.

What is claimed is:

1. A conveyor belt steam cleaning device configured to continuous clean, and alternately on-demand clean, a continuous loop conveyor belt having a surface and within a conveyor stand supporting the conveyor belt configured to remove any solids and fluids from the conveyor belt to provide a clean conveyor belt surface as the conveyor belt moves around a conveyor, the device comprising:
   a housing removably attachable to a top side of the conveyor stand in a horizontal position with respect to the conveyor belt surface, the housing formed of thermal insulated material configured to deflect heat and moisture from steam towards the conveyor belt surface;
   a steam spraying unit disposed within the housing wherein the steam spraying unit comprises a tube and a plurality of nozzles configured to dispense steam as the conveyor belt surface moves under the steam spraying unit;
   a wiping unit disposed within the housing wherein the wiping unit comprises at least one roller disposed across and in contact with the conveyor belt surface, the wiping unit configured to wipe and dry the conveyor belt surface as it moves under the wiping unit;
   a steamer unit disposed in a position directly beneath a conveyor stand, the steamer unit comprising:
      an actuator in operational communication with a power source, wherein the actuator activates and alternately deactivates the steamer unit;
      a boiler having a heating element, the boiler being in operational communication with the actuator, the boiler being configured to contain and heat water to the temperature required convert water to steam having a top end configured with a first pipe and a bottom end configured with a second pipe, and a continuous outer wall configured with a port and a port plug, wherein the heating element is disposed within the outer wall proximal to the bottom end, wherein the first pipe is configured to couple to the tube of the steam spraying unit and facilitate the transfer of steam produced by the boiler to the steam spraying unit, wherein the port is configured to allow the addition of water to the boiler and the port plug seals the port for team pressurization when closed;
   a water collection tray disposed within the conveyor stand directly below the conveyor belt and the housing, the water collection tray having a rectangular prism shaped cavity having an open top side, a closed bottom side configured with a third pipe, and four sides. The water collection tray collects the condensate from the steam spraying unit as the conveyor belt moves around the conveyor;
   a pump in operational communication with the actuator disposed between the water collection tray and a filter unit, wherein the pump is configured to couple with the third pipe of the water collection tray and to drain the tray and pump the condensate to the filter unit, wherein the filter unit is configured to remove impurities and solids from the condensate and couple to the second pipe of the boiler, wherein the pump is configured to recycle the filtered condensate from the water collection tray back to the boiler.

2. The conveyor belt steam cleaning device of claim 1 wherein the roller comprises an absorbent layer, wherein the absorbent layer is configured to dry the conveyor belt.

3. The conveyor belt steam cleaning device of claim 2 wherein the roller is disposable.

4. The conveyor belt steam cleaning device of claim 3 wherein the absorbent layer is formed of microfiber.

\* \* \* \* \*